3,597,229
Patented Aug. 3, 1971

3,597,229
BUTTERLIKE MARGARINE
Aart Mijnders, Ridderkerk, and Herbert Willem Lincklaen Westenberg, Vlaardingen, Netherlands, assignors to Lever Brothers Company, New York, N.Y.
No Drawing. Filed Dec. 29, 1967, Ser. No. 694,381
Int. Cl. A23d 3/00
U.S. Cl. 99—122R
6 Claims

ABSTRACT OF THE DISCLOSURE

Margarine having butterlike properties prepared from a fat blend comprising an olein fraction melting at 30–36° C. of a rapidly crystallizing hydrogenated animal or vegetable fat.

---

This invention relates to an improved fat blend suitable for making margarines resembling butter and to margarines made therefrom.

The term "fat" is used herein to include both fatty acid glycerides which are solid at about 25° C. as well as those which, being liquid at that temperature are commonly referred to as "oils."

Consumer tests have shown that, other things being equal, the more closely a margarine is considered by the consumer to resemble butter the more it is valued. It is a principal object of the present invention to provide a fat blend from which margarines can be made which will be regarded by the consumer as closely resembling butter. The judgment as to degree of resemblance is to some extent a subjective one and one method of assessing this quality is by means of tasting tests carried out by panels of expert tasters. In addition, however, determination of certain physical properties is of value in estimating the quality in question. Thus it has been found that margarines closely simulating butter can be made from fats which melt quickly in the mouth to a thin non-cloying liquid and of which at least two of the properties hardness, elasticity and work softening lie between certain limits which will be defined below.

The present invention provides a series of new fat blends from which margarines can be made which judged by the panel test referred to or by the combination of the physical properties specified closely resemble butter.

Accordingly, the present invention provides a fat blend suitable for use as the fat phase in the manufacture of margarine, the blend having dilatations at 37° C. of not more than 40, at 30° C. of not more than 150, at 20° C. of not less than 350 and at 15° C. of at least 300 more than at 25° C., and comprising an olein fraction melting between 30 and 36° C. of a partially hydrogenated rapidly crystallising vegetable or animal fat in an amount from 35—80% for a vegetable fat and from 50–80% for an animal fat.

In this specification all parts, proportions and percentages are by weight.

The olein fraction of the partially hydrogenated animal or vegetable fat is a rapidly crystallising fat fraction, that is to say that there is a great increase in the percentage of solid phase present during the cooling and crystallising treatment to which the composition is subjected during margarine manufacture because after the cooling and crystallising treatment the margarine should remain plastic on storage. Post-crystallisation should be repressed in order to decrease the percentage of work softening.

The rate of crystallisation is determined by heating a dilatometer filled with fat to a temperature at which that fat is completely melted, e.g. 60° C. The dilatometer is then placed in a bath at a temperature at which the rate of crystallisation is measured, e.g., 0° C. From this moment the volume of the dilatometer is read at regular intervals.

Suitable vegetable fats include sunflower and safflower oil, partially hydrogenated and then fractionated to a melting point of 30–36° C. provided the fraction crystallised rapidly as defined and has acceptable organoleptic properties. A similar fraction obtained from cottonseed oil hydrogenated under iso-promoting conditions to a melting point of approximately 37° C., is especially preferred.

The partially hydrogenated vegetable fat should contain at least 25% of unsaturated fatty acids, based on the total amount of fatty acids, after the hydrogenation.

Preferably the vegetable fats are partially hydrogenated in the presence of an iso-promoting sulphur-poisoned hydrogenation catalyst to obtain a hardened fat with steep dilatations and a melting point from 35–40° C. The hardening can, for example, be carried out with 0.5% of a sulphur-poisoned nickel catalyst, precipitated on kieselguhr, at temperatures from 150–180° C.

In this way it is possible to obtain glycerides with an amount of trans-acids of 50–70% based on the total amount of fatty acids.

The hardening treatment may also be carried out with a fresh precipitated non-poisoned nickel on guhr catalyst. This hardening is preferred when vegetable fats, e.g. certain types of soybean oil are used, which do not remain stable as concerns flavour after treatment with a sulphur containing catalyst. Such fats therefore are preferably hardened with a fresh nickel catalyst at temperatures of about 180° C. This hardening may also be carried out in two or more stages, e.g. at 100° C. and at 180° C. With this type of hardening also high trans-fatty acid contents may be obtained, e.g. of 40–60% based on the total amount of fatty acids, by the choice of temperature at which the hydrogenation is carried out.

Animal olein fractions suitable for the margarine fats of the invention should be derived from animal fat of which at least 90% of all the fatty acids present contain less than three double bonds.

Animal fats having more than 10% of fatty acids with three or more double bonds, like most of the marine animal fats, will generally develop off-flavours as a result of an oxidation process and for that reason they are unsuitable for a good-quality margarine.

When an olein fraction of an animal fat is used, e.g. beef or mutton tallow, or lard, the fat should be hydrogenated only to a very moderate extent before it is fractionated, preferably giving a drop in iodine value of no more than 5 or 6 and using for preference as catalyst a metal which is less active than nickel, for example 0.01–0.5% of copper, for example at temperatures from 150–250° C.

During hydrogenation an improvement in colour and flavour stability of the fat is effected.

It is surprising that animal fats, e.g. tallow, by a treatment of light hydrogenation combined with general improvement in taste and keeping properties, provide an olein fraction having properties which make it eminently suitable for the obtaining of a high-quality margarine. The fats must of course have acceptable organoleptic properties after the treatment.

The fractionation of the hydrogenated animal or vegetable fat may be carried out by any of several methods, e.g. fractionation with the aid of solvents or in the presence of an aqueous solution containing a small amount of a wetting agent. In general a method is preferred in which the fat is heated to about 60° C., quickly cooled to 40° C., followed by gradual cooling to 33–36° C. in about 4 hours and subsequently kept at this temperature for 2 hours. The cooling should be carried out under gentle stirring. After the crystallization period the stearins are filtered off in the usual way. The olein is generally obtained in a yield of at least 50%, the amount depending on the fatty acid composition of the hydrogenated fat. The determining factor in carrying out the fractionation treatment is the required melting point of the olein fraction, which is in general independent of the drop in iodine value. Preferably 15–30% is removed from a hydrogenated cottonseed oil, 20–36% from soybean oil and 35–45% from beef tallow after hydrogenation.

The olein fraction may be mixed with all kinds of liquid vegetable fats which have a good taste and keeping qualities, preferably from 10–30%, which may or may not have been subjected to interesterification and/or slight hydrogenation treatments, for example soybean oil, sunflower oil, safflower oil, corn oil, groundnut oil, rapeseed oil or cottonseed oil. If subjected to a mild hardening treatment the vegetable fats should retain their liquid character.

Fats of the coconut oil type are also preferably incorporated, in addition to the liquid vegetable fat, as a third component in the fat blends according to the invention, preferably in an amount of 10–40%, especially for the purpose of adjusting the dilatation values at 15 and 25° C. of the final fat blend. Fats of the coconut oil type for this purpose include natural fats of the coconut oil type, e.g. coconut oil, palmkernel oil, babassu oil and other natural oils containing substantial amounts of $C_{12}$ and $C_{14}$ fatty acids, artificial fats of the coconut oil type, obtained by hydrogenation of vegetable fats containing not more than 20% saturated fatty acids, e.g. sunflower oil, safflower oil, groundnut oil and rapeseed oil, which have been subjected to a hydrogenation treatment under iso-promoting conditions to raise the transacids content appreciably, preferably to 60–80%, or an olein fraction of the treated vegetable fats. Preferably the hydrogenation conditions are so chosen that the treated fats or olein fraction has a steep dilation/temperature line such that the difference between $D_{15}$ and $D_{25}+D_{30}$ is greater than 500 with a slip melting point of 25–30° C. (D indicating dilatation).

When a natural fat of the coconut oil type is used as the third component of the margarine fat, from 10–35% may be incorporated in the blend. When, however, the third component consists of a mixture of natural and artificial fats of the coconut oil type, whether or not it has been interesterified, from 10–40% should preferably be added to the olein fraction and the liquid vegetable oil and from 20–40% when it consists wholly of the coconut type artificial products.

Suitable fat blends according to the invention are obtained by mixing 20% of a liquid oil, e.g. maize— or sunflower oil with 20% coconut and/or palmkernel oil, 5% palm oil and 55% of an olein fraction of cottonseed oil having a melting point of 32–33° C., hydrogenated to a melting point of 36–38° C.

The invention also provides a method for the manufacture of a margarine in which the fat blend described is emulsified with a water phase and the emulsion is subjected to cooling and crystallizing conditions in one or more surface-scraped heat exchangers and resting tubes, preferably for at least two minutes. Thereafter the margarine may be packed and is preferably stored at a temperature of 10–20° C.

Margarines made with the new fat blends may contain higher amounts of naturally occurring linoleic acid than butter and may also possess better keeping properties on account of a better water partition of the emulsion.

In the usual margarine equipment many hardened fats will rapidly crystallise and develop polymorphs of high melting constituents via the alpha- into beta-prime modification.

Further it is possible that small crystals will develop during the cooling and crystallising conditions, which crystals will grow when the margarine is stored, thus causing brittleness of the margarine. In some cases this growth is caused by a transition from the beta-prime into the beta modification. It was found that the glycerides present in the margarines of the present invention substantially remain in a stable beta-prime modification.

The margarine may be prepared in conventional closed tubular surface-scraped heat exchangers as described for example in "Margarine" by A. J. C. Andersen and P. N. Williams, Pergamon Press 1965, pp. 264 et seq.

Scraped surface heat exchanger arrangements as described for example in British patent specifications 639,743, 650,481 and 765,870 are especially suitable for this purpose.

It is desirable to cool and crystallise the blend of fats and water phase for at least two minutes, in order to obtain a margarine which is substantially crystallised before entering the packaging unit, but the margarine must not be overworked and become too soft and preferred overall residence times therefore are from 5 to 10 minutes.

Preferably also the temperature of the margarine before packaging is from 10–15° C.

In order to maintain as long as possible the butter-like properties of the margarine so prepared the product should be stored at temperatures from 10–20° C., preferably from 12–16° C.

Reference has been made above to the assessment of similarity to butter in terms of certain physical properties and further details of this method of assessment will now be given. The melting time in the mouth should be as short as possible and in any event not greater than 15 seconds, and on melting a thin, non-cloying liquid should be produced. This thin-melting quality can be estimated by an eating quality test described below.

The elastic modulus G, measured as described by A. J. Haighton, Chem. Weekblad 60 (1964) pp. 508–511, at 12.5 to 17.5° C. should preferably be not more than $20.10^6$ dynes/cm.$^2$ and is most desirably less than $16.10^6$ dynes/cm.$^2$.

The work softening over the same temperature range should not be greater than 70% and is preferably between 50 and 60%. The hardness over this temperature range should be between 400 and 1,250 preferably 750 to 850 g./cm.$^2$.

The work softening is the relative decrease in hardness of a sample of butter or margarine after mechanical treatment and is determined by kneading the sample isothermally and by measuring the hardness before and after kneading. The hardness of butter or margarine samples is measured with the aid of a cone penetrometer by the method of A. J. Haighton as described in J. Am. Oil Chem. Soc. 36 (1959), pp. 345–348; the work softening is measured by a method of the same author described in J. Am. Oil Chem. Soc. 42 (1965), pp. 27–30.

With respect to the organoleptic properties the margarine should be quick and thin melting in the mouth. Such organoleptic properties may be determined by the eating-quality test. This test is carried out under the following conditions: the blocks of margarine to be tested are stored at 15° C. during a least 24 hours in a storage area, in such a way that free air is circulated around the blocks so that the entire block will reach the temperature of 15° C. Samples of 1 gram are then made with a sample cutter.

One or more pats of the product to be tested are placed for each member of the panel on a previously cooled piece of grease-proof paper. One pat is put in the mouth and chewed with regular movements of about two per second. The rate of melting is expressed in the number of seconds necessary for the sample to melt in the mouth. At the same time the test subject receives an impression of the "mouth feel" of the molten sample. This assessment is expressed in marks ranging from 1 to 10, in which:

1=thick, highly viscous, chewy
5=moderate
10=very thin melting while the other marks give intermediate gradations.

With respect to the "general resemblance to butter" the margarine should give a butter-like impression to the panel on manual assessment and appearance, which is expressed as:

1 = very little resemblance
3 = little resemblance
5 = moderate resemblance to butter
8 = good resemblance
10 = indistinguishable from butter while other marks can be given to intermediate gradations.

The following examples illustrate the invention:

EXAMPLE 1

Refined cottonseed oil was hydrogenated under iso-promotive conditions in the presence of 0.5% of a sulphur-poisoned nickel catalyst, precipitated on kieselguhr, at a temperature of 170° C. and at atmospheric pressure until a melting point of 36° C. and a trans content of 58% was obtained. Subsequently the oil was dry-fractionated as described until 27% of stearine was removed, when the melting point of the olein left was 32° C.

A fat blend of the following composition was prepared:

20% sunflower oil
20% coconut oil
5% palm oil
55% of the olein

The blend was emulsified with about 16% aqueous phase at a temperature of 39° C. and treated in the apparatus as described in "Margarine" by A. J. C. Andersen and P. N. Williams (1965) on page 255, a mixture of fresh and recirculated emulsion being fed into a precrystallising unit and subsequently into a Votator A-unit.

The temperatures (° C.) were:

Inlet pre-crystalliser _____ 16
Outlet pre-crystalliser _____ 26
Inlet A-unit _____ 25
Outlet A-unit _____ 7

The cooled emulsion was thereafter fed into a Votator B-unit where the undercooled emulsion was further crystallised.

The residence times (sec.) were:

Pre-crystalliser _____ 100
A-unit _____ 12
B-unit _____ 200

From the margarine thus obtained the rheological characteristics were determined and also an "eating quality test" was carried out.

The results of the analysis were:

Hardness at 15° C. (g./cm.$^2$) _____ 850
Work softening at 15° C. (percent) _____ 60
Elastic modulus G at 15° C. (dn./cm.$^2$) _____ 13.4×10$^6$
Fat dilatation values:
    $D_{20}$ _____ 450
    $D_{30}$ _____ 80
    $D_{37}$ _____ 0
    $D_{15}$–$D_{25}$ _____ 400

Melting time in the mouth of 1 g. sample at 15° C.: 10 sec.
Mouth feel of the molten sample (score): 8–9
General resemblance to butter (score): 7–8

EXAMPLE 2

In the equipment described in British patent specification 765,870 a fat blend was treated consisting of:

55% olein fraction of the same batch as used in Example 1
25% sunflower oil, and
20% natural coconut oil.

0.9 ton/hour of the fat blend at 34° C. with the same proportion of water phase as before at 10° C. was introduced into the first of two Votator A-units at a temperature of 13° C. and was combined with 0.7 ton hour more of the fat blend (at 28° C.). This mixture of 1.6 tons/hour passed through two pre-crystallising units and after 320 seconds residence reached the first of four following A-units in series at a temperature of 24° C.

After another 12 sec. the emulsion was introduced into Votator B-units at a temperature of 10° C. and in 63 sec. the margarine reached a packaging unit at a temperature of 13.5° C.

The results of the analysis of the margarine were:

Hardness at 12.5° C. (g./cm.$^2$) _____ 900
Work softening at 12.5° C. (percent) _____ 69
Elastic modulus G—at 12.5° C. (dn./cm.$^2$) ___ 19.5×10$^6$
Elastic modulus G—at 15° C. (dn./cm.$^2$) ____ 16.1×10$^6$
Fat dilatation values:
    $D_{20}$ _____ 450
    $D_{30}$ _____ 50
    $D_{37}$ _____ 0
    $D_{15}$–$D_{25}$ _____ 385

Melting time in the mouth of 1 g. sample at 15° C.: 12 sec.
Mouth feel of the molten sample (score): 7–8
General resemblance to butter (score): 8

EXAMPLE 3

Cottonseed oil hardened to a melting point of 35–37° C. under the same conditions as described in Example 1 was topped at 34° C. to an olein product with the following dilatations:

$D_{20}$ _____ 1175
$D_{30}$ _____ 315
$D_{37}$ _____ 0
$D_{15}$–$D_{25}$ _____ 540

A fat blend was prepared having the following composition:

55% of olein product
25% cottonseed oil
20% palmkernel oil.

The fat blend was premixed with 16% of a water phase in a stirred vessel at a temperature of 38° C. to form an emulsion which was passed through a Votator A-unit with a residence time of 15 seconds. The emulsion at a temperature of 6–8° C. then entered a B-unit, provided with a perforated plate with 2 mm. holes, and after 8 minutes' residence reached a packaging unit at a temperature of 13–14° C. where it was packed.

The properties of the margarine prepared were compared with those of butter and a good quality household margarine using the tests described. The results appear in Tables 1, 2 and 3.

TABLE 1

| | Dilatations | | |
|---|---|---|---|
| | Margarine [1] | Butter | Household margarine |
| Temperature (° C.): | | | |
| 15 | 690 | 680 | 570 |
| 20 | 460 | 380 | 240 |
| 25 | 230 | 240 | 120 |
| 30 | 50 | 135 | 40 |
| 37 | 15 | 40 | 10 |
| | Elastic modulus G (×10$^6$ dn./cm.$^2$) | | |
| 15 | 19 | 8 | 40 |

[1] According to invention.

Hardness values, indicated by C-values, were estimated one week after production, for samples of the margarine prepared as described and butter were stored at 15° C. temperature and tested. Results are given in Table 2.

TABLE 2

| Product | C-value (g./cm.$^2$) | Work softening (percent) |
|---|---|---|
| Margarine | 955 | 55 |
| Butter | 1,045 | 59 |
| Household margarine | 820 | 80 |

TABLE 3

| Panel assessment | Margarine [1] | Household margarine | Butter |
|---|---|---|---|
| Melting time in the mouth at 15° C. (sec.) | 12 | 12 | 11 |
| Mouth feel of the molten sample (score) | 9 | 8 | 9 |
| General resemblance to butter (score) | 8.6 | 6.5 | 10 |

[1] According to invention.

From the results of the tests carried out in the foregoing examples it can be seen that the rheological properties of the margarine of the present invention compare favourably with those of butter, while the results of the panel assessment were even more favourable. The household margarine showed a distinctly inferior consistency as is seen in the structural hardness.

EXAMPLE 4

In the same equipment as used in Example 1 three margarines were prepared in the manner described, from fat blends including the cottonseed olein fraction described in Example 1. Each composition also contained sunflower oil, palm oil and a natural or artificial coconut oil. The latter was obtained by hydrogenating safflower oil under iso-promotive conditions until a melting point of 26° C. was obtained, in the presence of 0.5% of a sulphur-poisoned nickel catalyst, at a temperature of 170° C. and at atmospheric pressure. Further details in Table 4 and the results of tests carried out on the margarine products appear in Table 5.

TABLE 4

| | Experiment No. | | |
|---|---|---|---|
| | 1 | 2 | 3 |
| | Composition, percent | | |
| Component: | | | |
| Olein | 50 | 50 | 50 |
| Sunflower | 25 | 25 | 25 |
| Palm | 5 | 5 | 5 |
| Natural coconut | 5 | Nil | Nil |
| Artificial coconut | 15 | 20 | 35 |
| Working conditions: | | | |
| Temperature behind 2d A-unit, ° C. | 5.4 | 4.4 | 2.0 |
| Temperature on wrapping, ° C. | 14.3 | 14.4 | 10.7 |

TABLE 5

| | Experiment No. | | |
|---|---|---|---|
| | 1 | 2 | 3 |
| Analysis: Consistency (after 1 week at 15° C.): | | | |
| Temp., ° C.: | | | |
| 15: Hardness (g./cm.$^2$) | 1,135 | 1,210 | 735 |
| 20: Hardness (g./cm.$^2$) | 360 | 505 | 255 |
| Work softening (percent) | 62 | 56 | 42 |
| Elastic modulus G (dn./cm.$^2$) | 17.7×10$^6$ | 34.5×10$^6$ | 29.4×10$^6$ |
| Dilatation values at: | | | |
| 20° C. | 555 | 590 | 540 |
| 30° C. | 150 | 100 | 70 |
| 37° C. | 20 | 10 | 0 |
| 25°–15° C. | 405 | 385 | 395 |
| Panel assessment: | | | |
| Melting time in the mouth at 15° C. (sec.) | 14 | 13 | 10 |
| Mouth feel of the molten sample (score) | 7 | 8 | 9 |
| General resemblance to butter (score) | 7.9 | 7.6 | 7.3 |

EXAMPLE 5

A refined soybean oil, having an iodine value of 130, was hydrogenated in two stages, first at a temperature of 100° C. until an iodine value of 102 was obtained and then at 180° C. until an iodine value of 68 was obtained.

The reaction was carried out at atmospheric pressure and in the presence of 0.15% freshly precipitated nickel on kieselguhr catalyst. The oil obtained had a trans content of 44% based on the total amount of fatty acids.

Subsequent to the hydrogenation, the oil was dry-fractionated at a temperature of 34° C. in the manner already described to remove 31% of stearine. The residual olein fraction was used in the following fat blend which was first interesterified, to prepare margarine in the same equipment as described in Example 1.

Fat composition: Percent
Olein fraction _____ 70
Coconut oil _____ 20
Mild hardened soybean oil _____ 10

The consistency investigation gave the following results:

Hardness (g./cm.$^2$) _____ 925
$C_{15}$
Work softening at 15° C., percent _____ 63
Elastic modulus G (dn./cm.$^2$) _____ 16.3×10$^6$
Dilatation values at:
  20° C. _____ 505
  30° C. _____ 80
  37° C. _____ 0
  15–25° C. _____ 445

Panel assessment:
  Melting time in the mouth at 15° C. (sec.) ____ 13
  Mouth feel (score) _____ 9
  General resemblance to butter _____ 7.8

The results of the panel assessment and the good rheological properties show that a highly plastic margarine can be prepared from the olein fraction of the hardened soybean oil.

EXAMPLE 6

A margarine was prepared from a margarine oil containing:

Percent
Oleo tallow _____ 70
Coconut oil _____ 20
Sunflower oil _____ 10

The oleo tallow was prepared from a hydro-refined tallow of which 40% was removed by fractionation as previously described at 40 and 35° respectively.

The tallow was hydro-refined at a temperature of 185° C. and a pressure of 3–5 atmospheres in the presence of 0.1% copper in a catalyst prepared by co-precipitating copper, magnesium and silica, until the iodine value of the tallow decreased from 46.4 to 45.2 and the trans content of the hydro-refined fat was 10%, based on the total amount of fatty acids.

The fat blend was mixed with 16% of a water phase and prepared with the equipment described in Example 3.

The working conditions in the Votator arrangement were:

Temperature premix (° C.) _____ 38–40
Temperature before A-unit (° C.) _____ 5–7
Temperature after A-unit (° C.) _____ 15–16
Residence time A-unit (sec.) _____ 24
Residence time B-unit (sec.) _____ 200

After 1 week's storage at 15° C. the margarine was analyzed with the following results:

Hardness at 12.5° C. (g./cm.$^2$) _____ 885
Work softening at 12.5° C. (percent) _____ 63
Elastic modulus G at 12.5° C. (dn./cm.$^2$) ____ 12.7×16$^6$ Dilatation values at:
   20° C. _____ 465
   30° C. _____ 145
   37° _____ 30
   15–25° C. _____ 390

Panel assessment:
   Melting time in the mouth at 15° C. (sec.) _____ 12
   Mouth feel of the molten sample (score) _____ 7
   General resemblance to butter (score) _____ 7.4

From the above it is evident that an excellent margarine may be prepared from fractionated and hydro-bleached tallow.

What is claimed is:

1. A margarine having butterlike consistency consisting essentially of:
(A) not less than 80% by weight of a fat blend with dilatations at 37° C. of not over 40, at 30° C. of not over 150, at 20° C. at least 350, and at 15° C. at least 300 higher than at 25° C., said fat blend consisting essentially of:
  (i) an olein fraction selected from the group consisting of
    (a) an olein fraction having a melting point of 30–36° C. and being present in a proportion of 35% to 80% by weight of said fat blend, said olein fraction being derived from partially hydrogenated vegetable oils selected from the group consisting of hydrogenated cottonseed, hydrogenated sunflower, hydrogenated safflower and hydrogenated soybean oil having a melting point of 35° to 40° C. and having 40% to 70% trans fatty acids based on total amount of fatty acids, and
    (b) an olein fraction derived from hydrogenated tallow, said olein fraction having a melting point of 30° to 36° C. and being present in a proportion of 50% to 80% by weight of said fat blend, said hydrogenated tallow having an iodine value of about 1 to 6 less than the iodine value of said tallow prior to hydrogenation,
  (ii) 10% to 30% by weight of a liquid vegetable oil, and
  (iii) 10% to 40% by weight of a fat of the coconut oil type, the weight ratio of said liquid vegetable oil to said oil of the coconut oil type being not greater than 1.5;
(B) an aqueous phase constituting the balance, said margarine having (1) triglyceride crystals substantially all in the beta prime modification; (2) a melting time in the mouth of not more than 15 seconds; (3) an elastic modulus G of not more than 20×16$^6$ dyne per cm.$^2$ at 12.5° to 17.5° C.; and (4) a work softening value of at most 70 at 12.5° to 17.5° C.

2. A margarine having butterlike consistency consisting essentially of:
(A) not less than 80% by weight of a fat blend with dilatations at 37° C. of not over 40, at 30° C. of not over 150, at 20° C. at least 350, and at 15° C. at least 300 higher than at 25° C., said fat blend consisting essentially of:
  (i) an olein fraction selected from the group consisting of
    (a) an olein fraction having a melting point of 30° to 36° C. and being present in a proportion of 35% to 80% by weight of said fat blend, said olein fraction being derived from partially hydrogenated vegetable oils selected from the group consisting of hydrogenated cottonseed, hydrogenated sunflower, hydrogenated safflower and hydrogenated soybean oil having a melting point of 35° to 40° C. and having 40% to 70% trans fatty acids based on the total amount of fatty acids, and
    (b) an olein fraction derived from hydrogenated tallow, said olein fraction having a melting point of 30° to 36° C. and being present in a proportion of 50% to 80% by weight of said fat blend, said hydrogenated tallow having an iodine value of about 1 to 6 less than the iodine value of said tallow prior to hydrogenation,
  (ii) 10% to 30% by weight of a liquid vegetable oil, and
  (iii) 10% to 40% by weight of a fat of the coconut oil type, that weight ratio of said liquid vegetable oil to said oil of the coconut oil type being not greater than 1.5;
(B) an aqueous phase constituting the balance, said margarine having (1) triglyceride crystals substantially all in the beta prime modification; (2) a melting time in the mouth of not more than 15 seconds; (3) an elastic modulus G of not more than 20×10$^6$ dyne per cm.$^2$ at 12.5° to 17.5° C.; and (4) a hardness value of 400 to 1250 at 12.5° to 17.5° C.

3. A margarine having butterlike consistency consisting essentially of:
(A) not less than 80% by weight of a fat blend with dilatations at 37° C. of not over 40, at 30° C. of not over 150, at 20° C. at least 350, and at 15° C., at least 300 higher than at 25° C., said fat blend consisting essentially of:
  (i) an olein fraction selected from the group consisting of
    (a) an olein fraction having a melting point of 30° to 36° C. and being present in a proportion of 35% to 80% by weight of said fat blend, said olein fraction being derived from partially hydrogenated vegetable oils selected from the group consisting of hydrogenated cottonseed, hydrogenated sunflower, hydrogenated safflower and hydrogenated soybean oil having a melting point of 35° to 40° C. and having 40% to 70% trans fatty acids based on the total amount of fatty acids, and
    (b) an olein fraction derived from hydrogenated tallow, said olein fraction having a melting point of 30° to 36° C. and being present in a proportion of 50% to 80% by weight of said fat blend, said hydrogenated tallow having an iodine value of about 1 to 6 less than the iodine value of said tallow prior to hydrogenation,
  (ii) 10% to 30% by weight of a liquid vegetable oil, and
  (iii) 10% to 40% by weight of a fat of the coconut oil type, the weight ratio of said liquid vegetable oil to said oil of the coconut oil type being not greater than 1.5;
(B) an aqueous phase constituting the balance; said margarine having (1) triglyceride crystals substantially all in the beta prime modification; (2) a melting time in the mouth of not more than 15 seconds; (3) a work softening of at most 70 at 12.5° to 17.5° C.; and (4) a hardness value of 400 to 1250 at 12.5° to 17.5° C.

4. A margarine in accordance with claim 1 wherein said fat blend consists essentially of 55% of an olein fraction of cottonseed oil having a melting point of 32° C.

hydrogenated to a melting point of 36° C., 25% sunflower oil, and 20% of natural coconut oil.

5. A margarine in accordance with claim 2 wherein said fat blend consists essentially of 55% of an olein fraction of cottonseed oil having a melting point of 32° C. hydrogenated to a melting point of 36° C., 25% sunflower oil, and 20% of natural coconut oil.

6. A margarine in accordance with claim 3 wherein said fat blend consists essentially of 55% of an olein fraction of cottonseed oil having a melting point of 32° C. hydrogenated to a melting point of 36° C., 25% sunflower oil, and 20% of natural coconut oil.

References Cited
UNITED STATES PATENTS

| | | | |
|---|---|---|---|
| 3,189,465 | 6/1965 | Oakley et al. | 99—122 |
| 3,240,608 | 3/1966 | Schmidt et al. | 99—122 |

RAYMOND N. JONES, Primary Examiner

J. R. HOFFMAN, Assistant Examiner

U.S. Cl. X.R.

99—118R, 123

UNITED STATES PATENT OFFICE
CERTIFICATE OF CORRECTION

Patent No. 3,597,229            Dated August 3, 1971

Inventor(s) Aart Mijnders and Herbert Willem Lincklaen Westenberg

It is certified that error appears in the above-identified patent and that said Letters Patent are hereby corrected as shown below:

Col. 6, line 1, "ton" should read --tons/--.

Col. 6, line 12, "69" should read --68--.

Col. 8, line 72, "5-7" should read --36-38--.

Col. 8, line 73, "15-16" should read --5-7--.

Col. 8, after line 73, a line was omitted. The line should read --Packaging temperature (°C) - 15-16--

Col. 9, line 5, "12.7 x $16^6$" should read --12.7 x $10^6$--.

Col. 9, line 60, "20 x $16^6$" should read --20 x $10^6$--.

Signed and seaaled this 27th day of June 1972.

(SEAL)
Attest:

EDWARD M. FLETCHER, JR.           ROBERT GOTTSCHALK
Attesting Officer                   Commissioner of Patents